United States Patent [19]
Ellis et al.

[11] Patent Number: 5,817,910
[45] Date of Patent: Oct. 6, 1998

[54] DESTROYING 1,4-DIOXANE IN BYPRODUCT STREAMS FORMED DURING POLYESTER SYNTHESIS

[75] Inventors: Robert Adrian Ellis; James Scott Thomas, both of Florence, S.C.

[73] Assignee: Wellman, Inc., Shrewsbury, N.J.

[21] Appl. No.: 672,578

[22] Filed: Jun. 28, 1996

[51] Int. Cl.$^6$ .................................................. B01D 53/72
[52] U.S. Cl. ........................ 588/205; 588/226; 588/228; 588/230; 423/245.3
[58] Field of Search .................... 588/205, 226, 588/228, 230; 423/245.3

[56] References Cited

U.S. PATENT DOCUMENTS

| | | | |
|---|---|---|---|
| T104,901 | 12/1984 | Cox et al. | 110/346 |
| 4,146,729 | 3/1979 | Goodley et al. | 560/94 |
| 4,285,881 | 8/1981 | Yang | 260/458 |
| 4,950,309 | 8/1990 | Schulz | 48/197 R |
| 5,393,916 | 2/1995 | Gamble et al. | 560/78 |

FOREIGN PATENT DOCUMENTS

| | | | |
|---|---|---|---|
| 498 509 A2 | 8/1992 | European Pat. Off. . | |
| 3841858 | 10/1989 | Germany | 423/245.3 |
| 49-043510 B | 5/1973 | Japan . | |
| 49-027587 B | 7/1974 | Japan . | |
| 55-164679 A | 12/1980 | Japan . | |
| 61-085436 A | 5/1986 | Japan . | |
| 5103844 | 4/1993 | Japan | 588/228 |
| 256780 A | 3/1970 | Russian Federation . | |
| 8601499 | 1/1988 | WIPO | 423/245.3 |

OTHER PUBLICATIONS

A.V. Popoola, Journal of Applied Polymer Science 43, 1875/1877 (1991) (No Month) "Mechanism Of The Reaction Involving The Formation Of Dioxane Byproduct During The Production Of Poly (Ethylen–Terephthalate)".

G.T. Joseph and D.S. Beachler, "APT 1 Course 415—Control of Gaseous Emissions" (Student Manual), published by the Environmental Protection Agency and Air Pollution Training Institute of the Research Triangle Park, NC, pp. 3–30 to 3–31 (1981), Dec.

Air Pollution Engineering Manual (Ed. John A. Danielson, published by the Environmental Protection Agency and the Office of Air Quality Planning and Standards, Research Triangle Park, NC) pp. 183–184 (1973), May.

R.W. Rolke et al., Afterburner Systems Study sponsored by the Environmental Proection Agency, Office of Air Programs, Research Triangle Park, N.C., Report No. EPA–R2–72–062, Chapter 5 (1972), Aug.

C.H. Marks, "Using Hazardous Liquid Wastes as Fuel", Plant Engineering, pp. 55–57 (1987), Oct.

J.J. Sudnick, "A Happy Ending in the Fight Against Haps", Environmental Protection, pp. 40–41 (1996) Apr.

Primary Examiner—Gary P. Straub
Assistant Examiner—Timothy C. Vanoy
Attorney, Agent, or Firm—Philip Summa, Patent Attorney

[57] ABSTRACT

A process for destroying dioxane in a water vapor stream includes combusting the stream to decompose dioxane contained therein. The process is particularly useful for removal of dioxane from byproducts streams which result during the production of polyester.

5 Claims, 1 Drawing Sheet

DESTROYING 1,4-DIOXANE IN BYPRODUCT STREAMS FORMED DURING POLYESTER SYNTHESIS

FIELD OF THE INVENTION

The present invention relates generally to a process for removing dioxane from water vapor, and more particularly to a process for destroying dioxane in vaporous byproduct streams resulting from chemical processes, including polyester synthesis.

BACKGROUND OF THE INVENTION

Because of their strength and heat and chemical resistance, polyester fibers and films are an integral component in numerous consumer products manufactured worldwide. As is well known, polyester is the polycondensation product of a dicarboxylic acid, such as terephthalic acid, with a dihydroxy alcohol, such as ethylene glycol. Various byproducts can form during esterification, such as water vapor and dioxane, among others.

1,4-Dioxane ($C_4H_8O_2$) is flammable, toxic and potentially explosive. Thus dioxane in byproduct streams must be destroyed or removed and disposed of safely. However, removal and disposal of dioxane can be difficult. Dioxane is very resistant to existing removal techniques. Further, dioxane and water have very similar boiling points, so that conventional distillation techniques based on differences in boiling point can be difficult.

Dioxane removal and disposal is further complicated if dioxane condenses, because of additional safety hazards that arise. Further, dioxane condensation triggers additional federal regulations which must be met to satisfy regulatory standards for the safe disposal of liquid dioxane. This increases the cost and difficulty of dioxane removal and disposal.

One technique suggested for separating water and dioxane is set forth in Japanese Application 55164679. The Abstract of this Japanese Application discloses drying cyclic ethers, including dioxane, by contacting the wet cyclic ether with an aqueous solution of an alkali metal hydroxide and an alkali metal halide.

Other techniques separate water from dioxane by distillation. For example, Japanese Application 74027587 teaches distilling an 80% dioxane and 20% water mixture. Japanese Application 73043510 teaches distilling water-containing dioxane at ambient temperatures to recover condensed dioxane. Russian Application 256780 teaches azeotropic removal of water from dioxane.

SUMMARY OF THE INVENTION

It is an object of the present invention to provide a process for removing dioxane and other byproducts in water vapor.

It is a further object of the present invention to provide a process for removing dioxane from water vapor by oxidizing and destroying dioxane and other byproducts present in a water vapor stream.

It is a further object of the present invention to provide a process for removing dioxane from byproduct streams resulting from chemical processes, including polymer production, which include water vapor.

It is a further object of the present invention to provide a process for removing dioxane from byproduct streams of chemical processes which is safe, efficient, and cost effective.

The present invention meets these and other objects by removing dioxane from water vapor byproduct streams resulting from chemical processes, and is particularly useful for removing dioxane from byproduct streams in the production of polyester. As the skilled artisan will appreciate, polyester production is generally conducted in two stages. The first stage is an esterification stage in which polyester starting materials react to form an esterification reaction mixture, which includes low molecular weight oligomers. The second stage is a polycondensation stage in which the low molecular weight oligomers are polymerized to form polyester.

In addition to low molecular weight oligomers, the esterification reaction mixture also includes various byproducts. As the skilled artisan will appreciate, heating glycol to temperatures about 280° C. and higher can result in the formation of 1,4-dioxane. Typically, the esterification reaction mixture is distilled to recover the various byproducts, including water and dioxane in their vapor phases. The recovered water vapor and dioxane are thereafter condensed and disposed of.

In the present invention, a mixture of these byproducts (i.e. dioxane in steam) is recovered from the distillation process. In contrast to prior procedures, however, the vapor byproducts are not condensed but rather are routed to a combustion unit. The vapor byproducts are injected into the combustion unit and heated for a time sufficient to decompose dioxane into simpler organic components, e.g., water vapor and carbon dioxide. These can then be safely recovered or vented from the combustion unit.

The process of the present invention thus provides for the destruction of dioxane in its vapor state, thus eliminating the safety concerns and regulatory standards associated with the disposal of liquid dioxane. The process is also simple and straightforward, and can utilize existing equipment typically present in a manufacturing facility.

Other advantages can also be realized by the present invention. Typically, overhead from distillation is condensed and reserved for reflux or reentry into the column for column temperature control. Condensate not needed for reflux typically overflows to some form of treatment system. In the invention, a portion of the overhead can be removed and directed into a combustion unit, as described above, in response to the monitored temperature of the column. A remaining portion of the overhead is condensed in a conventional manner to provide a substantially constant amount of condensate for column reflux and temperature control. This can efficiently regulate the temperature of the column without many of the problems associated with disposal of excess condensate.

BRIEF DESCRIPTION OF THE DRAWING

Some of the features and advantages of the invention having been described, others will become apparent from the detailed description which follows, and from the accompanying drawing, in which.

DETAILED DESCRIPTION OF PREFERRED EMBODIMENTS

Figure 1:
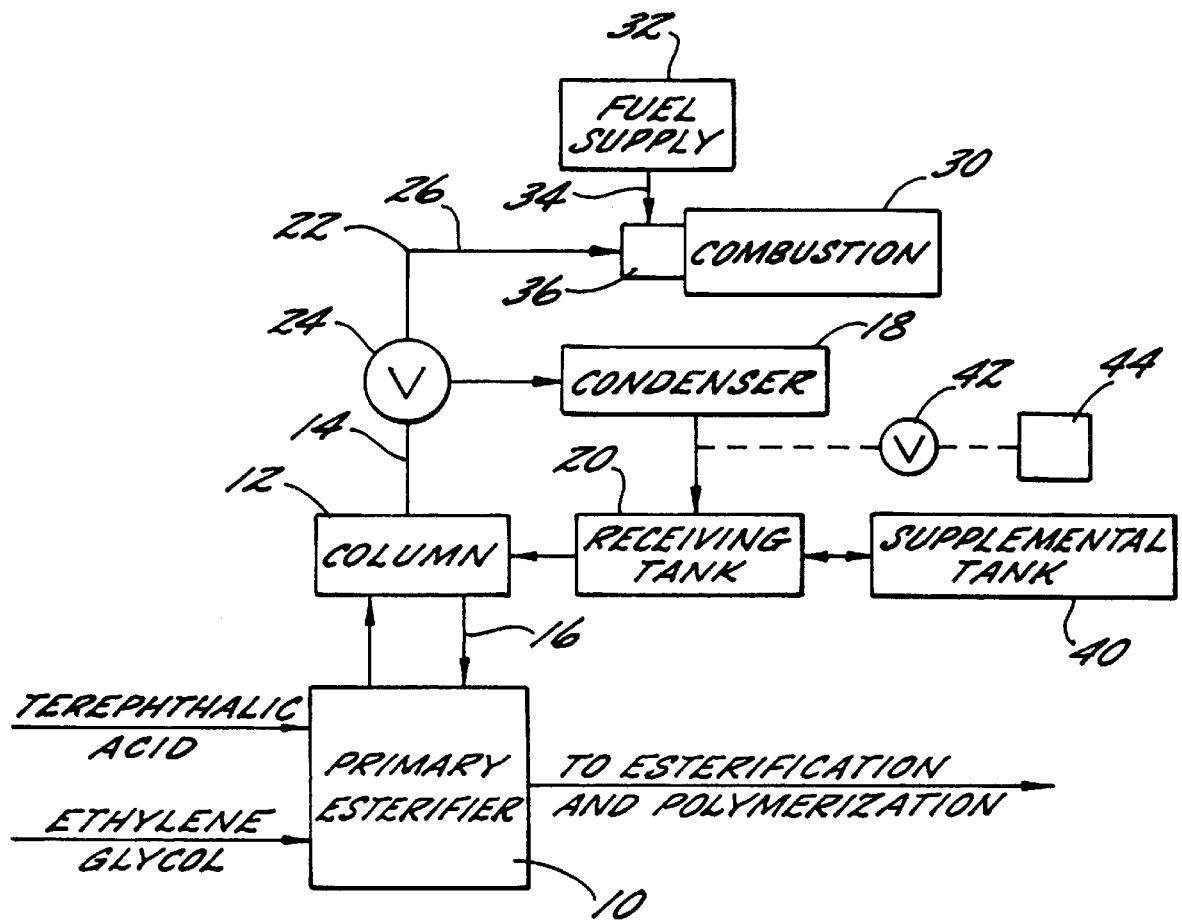
FIG. 1 schematically illustrates a process and apparatus in accordance with the present invention for removing dioxane from a byproduct stream resulting from the production of polyester.

Different process and apparatus embodiments of the invention are described below. Although the invention is described with reference to specific processes and apparatus, it will be understood that the invention is not intended to be so limited. To the contrary, the invention includes numerous alternatives, modifications and equivalents as will become apparent from a consideration of the forthcoming discussion and the following detailed description.

FIG. 1 schematically illustrates a process and apparatus in accordance with the present invention for destroying dioxane present in a byproduct stream resulting from the production of polyester. Although the process and apparatus are described herein with reference to polyester production, it will be appreciated that the invention is not limited to such use. Rather, the process and apparatus of the invention can be used to remove or destroy dioxane from water vapor streams generally, whether resulting from polyester production or from other chemical processes.

Polyester production is generally conducted in two stages, the first of which is an esterification stage in which polyester starting materials react to form low molecular weight oligomers. The second stage is a polycondensation stage in which the low molecular weight oligomers are polymerized to form polyester.

For example, polyethylene terephthalate (PET) can be produced from dimethyl terephthalate (DMT) and ethylene glycol, which react in a catalyzed ester interchange reaction to form bis(2-hydroxyethyl)terephthalate monomer and methanol. Terephthalic acid (TA) can be also be used as an alternative to DMT. In a reaction similar to that between DMT and ethylene glycol, terephthalic acid and ethylene glycol react in a generally uncatalyzed esterification reaction to yield low molecular weight oligomers, water, and various other byproducts. Preferably, substantially pure terephthalic acid is used, although the terephthalic acid may also contain small amounts of isophthalic acid and/or one or more functional derivatives of terephthalic acid including dimethyl terephthalate.

The resulting oligomers are thereafter polymerized to form PET polymer. PET polymer is substantially identical, either using TA or DMT as the starting dicarboxylic acid material, with possible exception of some of the end groups. PET polyester formation can be batch or continuous, and is typically a continuous process.

Turning now to FIG. 1, polyester polymer starting materials, namely, a dicarboxylic acid or an appropriate ester thereof and a dihydroxy alcohol, are fed to an esterification vessel 10 to produce an esterification reaction mixture, as described above. As the skilled artisan will appreciate, heating glycol to temperatures about 180° C. and higher can result in the formation of 1,4-dioxane. Generally, the esterification reaction mixture includes various byproducts, such as water and dioxane, among others, in addition to the polymer precursors.

Following esterification, the esterification reaction mixture is distilled with the use of a distillation column 12 to recover the byproducts of the esterification reaction prior to polycondensation. Although one esterification vessel and one column are illustrated in FIG. 1, the skilled artisan will appreciate that the monomer can be subjected to additional esterifications and distillations steps and thereafter polymerized through polycondensation to produce polyethylene terephthalate.

Distillation column 12 is operated at a temperature and pressure sufficient to form a low boiling point overhead stream 14, which includes various byproducts of esterification in the vapor state, and a high boiling point bottoms stream 16. The composition of overhead stream 14 can vary, depending upon the polyester starting materials used. For example, when the starting materials are ethylene glycol and terephthalic acid, the overhead vapor stream 14 includes water vapor. In addition, distillation conditions are also selected to remove dioxane from the esterification mixture as a component of the vaporous overhead product. Ethylene glycol can be recovered from the distillation column as a component of bottoms stream 16 and recycled into esterifier vessel 10. Overhead product stream 14 is thereafter directed to a conventional condenser 18 and into an esterification column condenser receiving tank 20.

As noted above, the operating temperature of the distillation column is maintained within a certain operating range selected to efficiently remove low boiling point byproducts and to prevent ethylene glycol from passing over the column. Conventionally, condensate from receiving tank 20 is passed back into the column for reflux as needed to maintain the operating temperature of the distillation column within a desired range.

Such systems can be advantageous for maintaining the temperature of the column 12 within a desired range. The presence of dioxane as a component of the overhead condensate, however, can be problematic. For example, if the amount of condensate required for temperature control of the column 12 is less than the total amount of condensate available at a given time, excess condensate is typically sent to a condensate overflow recovery zone for appropriate disposal or treatment. However, recovery of dioxane from the condensate can be complex and difficult. Further, dioxane condensation can trigger federal regulations.

To safely and efficiently dispose of the dioxane present in overhead stream 14, in the present invention, a portion of the overhead stream 14 is removed as a secondary stream 22 via a valve 24 prior to condensation. The secondary stream also includes the various byproducts of the esterification reaction described above in their vapor state. For example, when TA and ethylene glycol are the polymer starting materials, secondary stream 22 includes water vapor as the majority or predominant component thereof and dioxane in small amounts. Generally, secondary stream 22 comprises about 98% to about 99.5% by weight water vapor, and about 0.5% to about 2% by weight dioxane and other organic byproducts of esterification.

As indicated in FIG. 1, secondary stream 22 is directed via conduit 26 to a combustion unit 30. The temperature of the secondary stream is maintained at or above the temperature at which dioxane present therein condenses. To maintain the temperature of stream 22 within conduit 26 above a temperature at which dioxane will condense, conduit 26 can be heat traced and jacketed with conventional insulating materials.

Combustion unit 30 can be any of the types of combustion chambers capable of converting an energy source from one form to another. Particularly preferred are combustion chambers capable of igniting and burning fuel to produce heat. The combustion unit can be, for example, a boiler, a heater, a furnace, and the like, to which fuel, such as oil or natural gas, is supplied and ignited to produce a flame of sufficient temperature to destroy dioxane. The present invention provides the particular advantage that an existing combustion facility that is already present for one of such other purposes can be used for the combustion step of the present invention. Generally, combustion unit 30 is in fluid communication with a fuel supply source 32. A fuel supply line 34 supplies fuel from supply source 32 to a burner assembly 36, which includes a plurality of ports through which fuel is introduced into combustion unit 30 and ignited.

The temperature of the ignited fuel of burner assembly 36 is sufficient to oxidize dioxane present in the secondary stream 22 to thereby decompose dioxane into smaller, less hazardous, organic compounds. The organic products of dioxane decomposition can then be readily and safely recovered or vented from the combustion unit, for example, by discharging the combustion mixture to the atmosphere. To oxidize dioxane, the flame temperature is preferably at least about 1500° F., more preferably at least about 2000° F., and most preferably at least about 2500° F., and higher. A preferred temperature range is about 1500° F. to about 3500° F. Residence time of the secondary stream within the ignited fuel of burner assembly 36 is also selected to allow adequate decomposition of dioxane present therein. Residence time can vary depending upon factors such as the composition of the stream, flame temperature, flow rate, burner type and/or configuration, and the like, and appropriate residence times sufficient to destroy dioxane can be determined by the skilled artisan.

In a currently preferred embodiment of the invention, combustion unit 30 is a boiler, and burner assembly 36 includes a plurality of ports in a circular arrangement in fluid communication with one another for efficient introduction and ignition of fuel directed to the combustion unit. The secondary vapor stream 22 is directed to combustion unit 30 and injected into the burner assembly at a region proximate the fuel ports so that the ignited fuel can spread out and engulf the secondary vapor stream. In effect, the secondary stream is mixed with the fuel and becomes a part of the flame front, which oxidizes and decomposes dioxane in the secondary stream The use of a boiler as the combustion unit can be advantageous in many respects. For example, typically boilers are already present in a polyester production plant for energy generation. Thus, already existing systems can be readily retrofitted to receive overhead vapor streams from esterifier columns. Further, although injecting a mixture of water vapor and dioxane vapor into an energy generating apparatus can result in decreased efficiency of that apparatus, the decrease in efficiency is minimal, and the benefits of safe and efficient disposal of dioxane are well worth the trade-offs.

In another aspect of the present invention, a process for minimizing or eliminating condensate overflow is also provided, which avoids the problems associated with the disposal of excess condensate including condensed dioxane. In a conventional process, overhead from column 12 is directed to condenser 18 and receiving tank 20 for purposes of reflux and column temperature control to minimize loss of ethylene glycol. In contrast to conventional systems, however, in the present invention, a portion of the overhead stream 14 is removed as a secondary stream 22 via valve 24 prior to condensation. The amount of overhead removed from stream 14 can vary in response to the monitored temperature of the column (and fluctuations thereof) so as to provide a substantially constant level of condensate within receiving tank 20 as needed to maintain the column temperature within the desired range. By modulating the position of the valve 24, condenser receiving tank levels can be controlled such that tank overflow to downstream treatment systems is minimized or eliminated.

In addition, a device may also be provided in fluid communication with receiving tank 20 to reduce receiving tank 20 condensate level fluctuations and thus to protect reflux levels. For example, a supplemental condenser receiving tank 40 can be present as illustrated. Alternatively, a water supply 42 can be provided to supply water (or other appropriate cooling fluid) via valve 44 to receiving tank 20 in response to decrease levels of condensate therein.

In operation, a control system including sensors monitors column pressure and temperature conditions and mass flow over the column during distillation. Control hardware can be pneumatic, electric or pneumatic and electric based and can include a microprocessor as will be apparent to those skilled in the art. Valve 24 opens and closes in response to the monitored conditions of the column so as to direct an overhead stream volume to condenser 18 sufficient to maintain a substantially constant level of condensate within receiving tank 20 available for reflux and column temperature control.

A volume of condensate required to maintain the temperature of the column within a predetermined range is directed to receiving tank 20. The condensate volume within receiving tank 20 can vary, depending upon column temperature and pressure, mass of material being processed, mass flow of the material over the column, and the like, and can be readily calculated by the skilled artisan.

Although the above description generally applies to the continuous production of polyester terephthalate polyesters using terephthalic acid and ethylene glycol, it will be understood that the invention is not limited thereto and may be applied to batch or semi-continuous processes or the production of other PET polyester and other polyesters by other methods including the reaction of DMT and ethylene glycol to form PET polyester since modifications may be made by those skilled in the art, particularly in light of the foregoing description. Although one esterification vessel and one column are illustrated in FIG. 1, the skilled artisan will also appreciate that the process of the invention is not limited to the destruction of dioxane resulting from primary esterification, but can be used to destroy dioxane resulting from secondary esterifications, and other processes, as well. Still further, although the above description generally applies to the removal or destruction of dioxane from water vapor produced during polyester production, it will be appreciated by the skilled artisan that the invention is not limited to use in polyester production processes, but rather applies to the removal or destruction of dioxane from byproduct streams generally produced in other types of chemical processes. Still further, it is contemplated that streams of chemical processes (including byproduct streams of polyester production) which include condensed dioxane can be directed to combustion chamber 30 with or without first vaporizing the condensed stream. For example, a portion of condensed overhead from a distillation process can be routed within that same process to combustion chamber 30. Therefore, the forgoing is illustrative of the present invention and is not to be construed as limiting thereof. The invention is defined by the following claims, with equivalents to the claims to included therein.

That which is claimed is:

1. A process for destroying dioxane in a byproduct stream resulting from the production of polyester, comprising:

esterifying a dihydroxyl alcohol and a dicarboxylic acid or ester thereof to form a reaction mixture which includes esterification byproducts;

distilling the reaction mixture to remove at least a portion of the esterification byproducts from the reaction mixture in the form of a vapor stream of which the majority component is water vapor and which includes dioxane in the vapor state; and combusting at least a portion of the vapor stream under conditions sufficient to decompose at least a portion of the dioxane present in the overhead vapor stream into carbon dioxide and water.

2. The process of claim 1, wherein the overhead vapor stream comprises about 98% to about 99.5% by weight water vapor, and about 0.5% to about 2% by weight dioxane and other byproducts.

3. The process of claim 1, wherein said combusting step comprises combusting the overhead vapor stream at a temperature of at least about 1500° F.

4. The process of claim 3, wherein said combusting step comprises combusting the overhead vapor stream at a temperature from about 1500° F. to about 3500° F.

5. The process of claim 1, wherein the dihydroxyl alcohol is ethylene glycol and the dicarboxylic acid is terephthalic acid.

* * * * *